United States Patent
Zehavi et al.

(10) Patent No.: US 6,583,377 B2
(45) Date of Patent: Jun. 24, 2003

(54) WELDED SILICON MEMBER

(75) Inventors: Raanan Y. Zehavi, Sunnyvale, CA (US); Robert L. Davis, Belmont, CA (US); David B. Ackard, San Jose, CA (US); James W. Govorko, Sunnyvale, CA (US)

(73) Assignee: Integrated Materials, Inc., San Jose, CA (US)

( * ) Notice: Subject to any disclaimer, the term of this patent is extended or adjusted under 35 U.S.C. 154(b) by 0 days.

(21) Appl. No.: 10/135,072

(22) Filed: Apr. 30, 2002

(65) Prior Publication Data

US 2003/0089688 A1 May 15, 2003

Related U.S. Application Data

(62) Division of application No. 09/879,565, filed on Jun. 12, 2001, now Pat. No. 6,403,914, which is a division of application No. 09/708,807, filed on Nov. 8, 2000, now Pat. No. 6,284,997.

(51) Int. Cl.$^7$ .............................................. B23K 10/00
(52) U.S. Cl. ............................ 219/121.46; 219/121.48; 219/121.45; 228/232; 228/262.1
(58) Field of Search ..................... 219/121.46, 121.45, 219/121.48, 137 R; 228/232, 262.1

(56) References Cited

U.S. PATENT DOCUMENTS

| 3,923,609 | A | 12/1975 | Welch et al. ................. 204/16 |
| 3,950,479 | A | 4/1976 | Reuschel et al. ............ 264/248 |
| 4,302,658 | A | 11/1981 | Beigay .................... 219/137 R |
| 5,074,456 | A | 12/1991 | Degner et al. .............. 228/121 |

FOREIGN PATENT DOCUMENTS

| EP | WO 00/63952 | 10/2000 |
| JP | 02151385 | 6/1990 |
| JP | 11111628 | 4/1999 |
| JP | 11179565 | 7/1999 |

*Primary Examiner*—Mark Paschall
(74) *Attorney, Agent, or Firm*—Charles S. Guenzer

(57) ABSTRACT

Two silicon workpieces (20, 22) welded together into one member without the formation of cracks along the weld. It may be formed by a first method in which current (34, 36) is passed through one or both of the workpieces to heat them to between 600 and 900° C. Then an electric, laser, or plasma welder (38, 40) passes along the seam (24) between the workpieces to weld them together. In a second forming method, current (34) is passed through a plate (60), preferably formed of silicon, which either supports the workpieces or is brought into contact with at least one of them, whereby the workpieces are preheated prior to the welding operation.

37 Claims, 2 Drawing Sheets

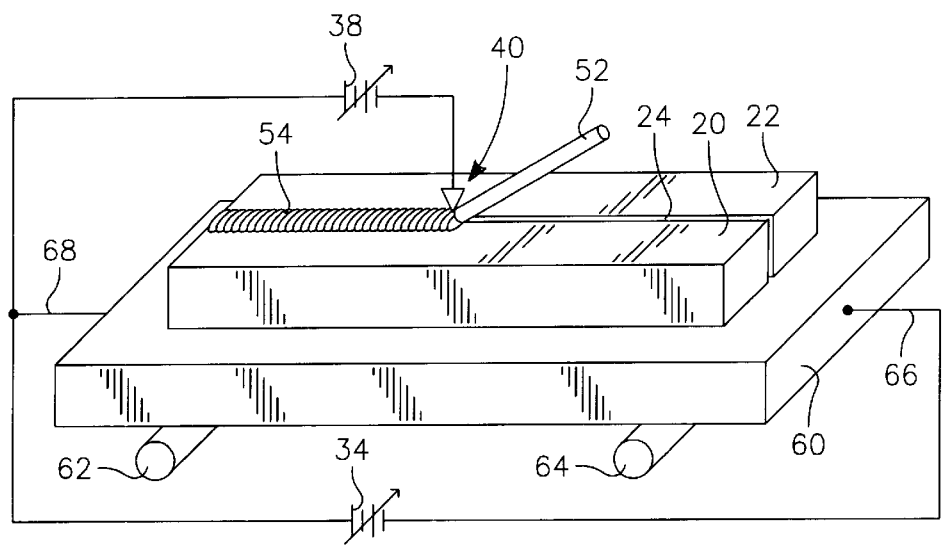
FIG. 4
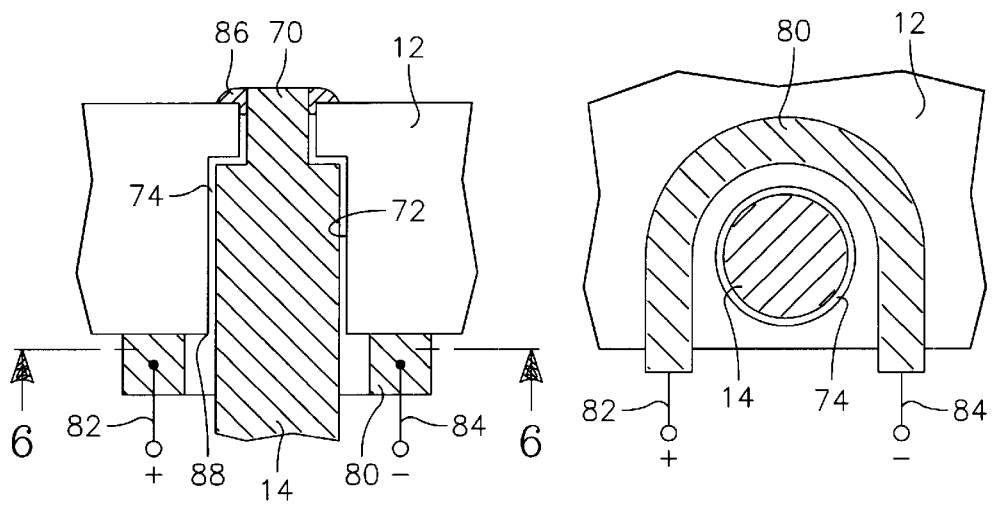
FIG. 5
FIG. 6

WELDED SILICON MEMBER

RELATED APPLICATION

This application is a division of Ser. No. 09/879,565, filed Jun. 12, 2001, now U.S. Pat. No. 6,403,914 issue fee paid, which is a division of Ser. No. 09/708,807, filed Nov. 8, 2000, now issued as U.S. Pat. No. 6,284,997.

GOVERNMENT INTEREST

Parts of the invention described herein were made by employees of the United States Government and may be manufactured and used by or for the Government of the United States of America for governmental purposes without the payment of any royalties thereon or therefor.

1. Field of the Invention

The invention relates generally to welding. In particular, the invention relates to welding together two silicon workpieces.

2. Background Art

Large complex structures composed of semiconductor-grade silicon are being sought for purposes such as a wafer tower 10 illustrated orthographically in FIG. 1 and disclosed by Zehavi in U.S. patent application Ser. No. 09/292,491, filed Apr. 15, 1999, now issued as U.S. Pat. No. 6,225,594. Boyle et al. disclose further details of such towers and their fabrication in U.S. patent application, Ser. No. 09/608,557, filed Jun. 30, 2000, incorporated herein by reference in its entirety. The tower of the example includes two bases 12 and four legs 14 joined to the bases 12. A plurality of parallel teeth 16 with intervening slots are machined into each of the legs 14 to support a plurality of silicon wafers on the wafer tower 10 during medium or high temperature processing of the wafers, for example, for annealing at high temperatures or thermal chemical vapor deposition at somewhat lower temperatures.

It is desired that the tower and particularly its legs be composed of the same material as the wafers, that is, silicon, and that the silicon be of semiconductor grade, that is, be of very high purity. Semiconductor-grade silicon is available with impurity levels of less than 1 ppm (parts per million atomic), if concentrations of up to 100 ppm of oxygen, nitrogen, and carbon are ignored, and sometimes the impurity levels are less than 1 ppb (parts per billion atomic). The impurity levels of oxygen, nitrogen, and carbon are far less than 1% atomic, whereby silica, silicon nitride, and silicon carbide are excluded from being characterized as semiconductor-grade silicon. Virgin polysilicon is an especially pure form of silicon grown by thermal chemical vapor deposition using one of several forms of silane as the precursor gas. Silicon has a melting temperature of about 1416° C. and remains strong and tough up to nearly that temperature. Thereby, silicon towers can be designed for extended use at high temperatures. The similarity of the materials of the support structure and of the supported workpieces minimizes differential thermal effects and eliminates contamination from non-silicon material. Furthermore, semiconductor-grade silicon with very low impurity levels is widely available at moderate cost in the form of virgin polysilicon. Support fixtures made of high-purity silicon reduce the danger of minute levels of impurities in the support structure diffusing into the semiconductor wafer and degrading its semiconductor characteristics.

Fabricating large complex silicon structures, however, has presented several challenging technical problems, particularly in joining two silicon members. Some type of fusion welding is desired both to maintain the low impurity levels in the joint and to assure that the joint remains joined at the extreme temperatures being contemplated. Zehavi has suggested laser welding. Plasma welding in an inert gas has also been suggested. While these methods have enjoyed some success, the reproducibility of the process and the overall strength of the weldment are still considered deficient.

A fundamental problem is that welding silicon with perhaps a silicon welding rod requires temperatures in excess of silicon's melting point. Tungsten inert gas (TIG) welders and plasma arc welders are well capable of achieving such temperatures at localized areas adjacent to the seam being welded. However, after the local area has been welded and the welding tip is moved further along the seam, the temperature of the region surrounding the already welded spot rapidly decreases. The resultant thermal stresses induced between hot and cold areas of the large silicon workpieces tend to crack the silicon near the welded seam. Although a cracked area does not unacceptably degrade the strength required for a structure supporting light silicon wafers, the cracks introduce a source of particulate contamination and also serve to initiate further fracturing of the assembled structure during repeated thermal cycling.

Ultrasonic welding of silicon solar cells is also known, but this method is not appropriate for the massive silicon bodies required in towers and similar large structures.

Accordingly, it is desired to achieve a method of joining large pieces of silicon that does not crack the silicon. It is further desired to achieve a joining method that can be used with high-purity silicon and does not significantly increase the silicon impurity level.

SUMMARY OF THE INVENTION

A method for welding silicon workpieces in which the workpieces are heated to at least 600 and preferably less than 900° C. and then a separate welding operation is performed, for example, by electrical welding, plasma welding, or laser welding.

A resistively heated plate is brought into contact with at least one of the workpieces and current is passed through the plate to heat it. A more complexly shaped resistively heated plate may be used to conform to non-planar workpieces. The plate is preferably formed of semiconductor-grade silicon, preferably virgin polysilicon.

The workpieces may advantageously be formed of virgin polysilicon having a very low impurity level.

The welding may be autogenous or use a high-purity silicon filler rod.

BRIEF DESCRIPTION OF THE DRAWINGS

FIG. 4 is a schematic illustration of a second embodiment of the invention.

FIG. 5 is a cross-sectional view of the joint between a tower base and leg and of a silicon collar used to heat the joint.

FIG. 6 is a cross-sectional view of the heater collar and leg taken along line 6—6 of FIG. 5.

DETAILED DESCRIPTION OF THE PREFERRED EMBODIMENTS

Figure 2:
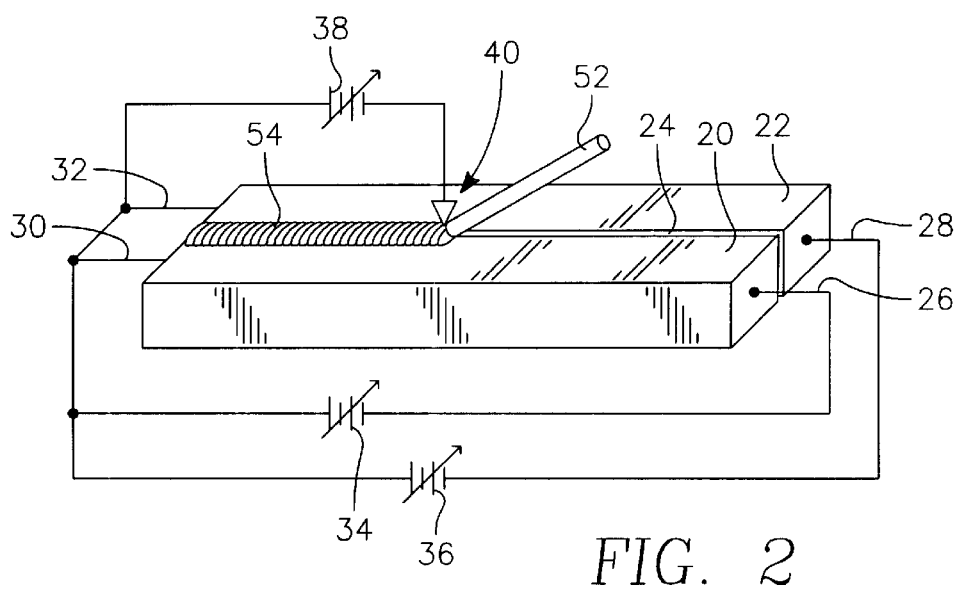
FIG. 2 is an schematic illustration of a first embodiment of the welding apparatus and method of the invention.

A first embodiment of the invention is schematically illustrated in FIG. 2 for joining together two silicon bars 20, 22 butted together along a seam 24. The support structure is not illustrated but is conventional. Anode contacts 26, 28 are formed on the neighboring ends of the two bars 20, 22, and cathode contacts 30, 32 are formed on the other ends of the bars 20, 22. The two anode contacts 30, 32 are electrically tied to each other. A first DC heater power supply 34 has its negative terminal connected to the anode contact 26 of the first silicon bar 20, and a second DC heater power supply 36 has its negative terminal connected to the anode cathode contact 28 of the second silicon bar 22. The positive terminals of both power supplies 34, 36 are commonly connected to the two cathode contacts 30, 32. Both heater power supplies 34, 36 may be standard commercial DC welding power supplies. A single heater power supply 34 may be used if proper control is available to assure that nearly equal currents flow through the two silicon bars 20, 22. It is also possible in some circumstances to supply current to only one of the bars and rely upon thermal conduction and radiation to also heat the other one. If the bars have smooth sides and are tightly clamped together, sufficient electrical and thermal conductance between the two bars will distribute a single heating current between the bars.

Figure 3:
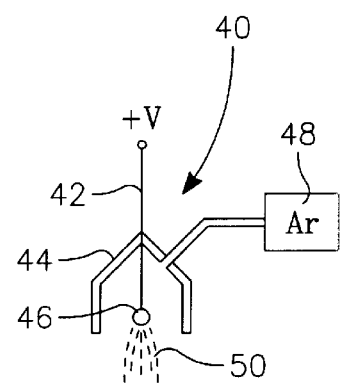
FIG. 3 is a schematic cross-sectional view of a inert gas welding head.

A DC welding power supply 38 has its positive terminal connected to both the cathode contacts 30, 32 and its negative terminal connected to the tungsten inert gas (TIG) head 40. The TIG head 40 has a structure schematically illustrated in FIG. 3. A power supply lead 42 penetrates a shroud 44 and terminates in a tungsten tip 46 positioned above the weld spot. When the welding power supply 28 is electrically biased sufficiently with respect to the underlying workpiece, an arc 50 is formed between the tungsten tip 46 and the more positively biased workpiece. The arc 50 is very hot and can easily melt the underlying workpiece. An inert gas such as argon is supplied from a gas source 48 into the shroud 44 and surrounds the arc 50 with an inert shield to prevent the weld from becoming contaminated.

An alternative but related welding head is configured for plasma arc welding. A small flow of arc gas is flowed through an orifice adjacent the tungsten tip 46 to form the arc plasma. A shielding gas is flowed through an outer nozzle assembly encircling the tungsten tip 46 and arc gas orifice to shield the arc and weld zone. The arc gas may be the same as the shielding gas and may include one or more of the noble gases, particularly helium and argon, and may additionally include nitrogen and/or hydrogen in proportions selected to optimize the weld. The plasma is initiated by an internal low-current pilot arc between the electrode and the arc orifice. The pilot arc ionizes the arc gas to ignite the primary arc between the electrode and the workpiece. The operation of this equipment may be manual or automated.

Plasma arc welding provides a very stable heat source for welding members of most metals having thicknesses in the range of 0.02 to 6 mm. This process offers advantages over other welding processes in its greater energy concentration, improved arc stability, higher heat content, and higher welding speed. However, plasma arc welding requires higher welding skill and more training than do other welding processes.

There are yet other welding processes, most of which are commonly referred to as electric welding. They include shielded metal arc welding, submerged arc welding, gas metal arc welding, flux cored arc welding, electroslag welding, electroglas welding, resistance welding, flash welding, diffusion welding, friction welding, electron beam welding, and laser beam welding.

Returning to FIG. 2, a silicon filler rod 52 may be fed to the area between the tungsten tip 46 and the weld seam 24 to supply any additional silicon needed to fill the seam 24 and weld its two sides together. The end of the filler rod 52 is also melted by the TIG head 40. The silicon filler rod 52 should have at least the same purity level as the bars 20, 22 being welded together. However, depending upon the geometry of the seam 24, it may be possible to weld without use of a filler rod and to rely upon excess silicon in the neighborhood of the seam 24, that is, autogenous welding.

In operation, the heater power supplies 34, 36 supply sufficient current to the bars 20, 22 to resistively heat them to at least 600° C. We have found that 50A of 25V DC power from each of the heater power supplies 34, 36 is sufficient to heat the bars 20, 22 to between 700 and 900° C. These temperatures may be monitored either with a thermocouple or with a pyrometer. In practice, the color of the silicon is sufficient to visually indicate the broad range of heating temperatures in which the invention may be practiced. The heating current may produce higher temperatures in the bars 20, 22 but below the silicon melting point. However, temperatures above 900° C. subject the welding apparatus to temperatures typically considered to be excessively high. Once the bars 20, 22 have been heated, about 10 to 30A of current from the welding power supply 38 is sufficient to raise a localized area around a spot of the seam 24 above silicon's melting temperature and to thereby weld the bars 20, 22 together. The TIG welder may be a spot welder that is slowly moved along the seam 24 to heat a localized area along the seam but to form a continuous weld bead as the TIG welder is slowly moved along the seam. The voltage across the welding power supply 38 depends in large part upon the position of the TIG head 40 between the cathode contacts 26, 28 and the anode contacts 30, 32 of the stronger heater power supplies 34, 36.

The current provided by the TIG head 40 further heats the neighboring areas of the silicon bars 20, 22 through which it flows, thereby providing a more gradual temperature gradient. Furthermore, when the TIG head 40 is moved away from the recently welded areas, the weldment and surrounding silicon cools from at least 1416° C. only to 600° C. as a minimum, rather than to room temperature or thereabout as is typical in the prior art. Only after the seam has been completely welded are the welded bars 20, 22 cooled down to room temperature by turning off the heater power supplies 34, 36. Thereby, the welded piece is cooled fairly uniformly, thus reducing the differential thermal expansion in this phase of the cooling.

The high-purity silicon desired for many applications may be a relatively electrically resistive material having a resistivity of usually 1 ohm-cm or greater, which at room temperature corresponds to a p-type boron concentration of about $1.5 \times 10^{16} cm^{-3}$ or an n-type phosphorous concentration of $4 \times 10^{15} cm^{-3}$. However, at 600° C., the intrinsic carrier density is already above $10^{17} cm^{-3}$ and is rapidly climbing with temperature. At these carrier densities, the silicon is highly conductive electrically. Depending upon the impedance characteristics of the heater power supplies, it may however be necessary to externally heat the silicon bars to raise their temperature to a temperature range for which they may be resistively heated with a low-voltage power supply. For silicon with higher doping concentrations, initial heating of the silicon is not typically required.

Although an electrical current welder is preferred, it is possible to use an optical welder such as a laser in place of the TIG head and the second power supply. It is also possible to use AC power supplies rather than DC, but DC current is standard welding practice. The polarities for the welding currents may be rearranged. Yet other types of welders of the type listed above may be used.

The welder of FIG. 2 however suffers some drawbacks. Low-impedance electrical contacts need to be made with the silicon workpieces being welded. The contacting process takes time. Furthermore, the contacts require electrical contact to a metallization such as molybdenum. During the high-temperature processing contemplated, the metallization atoms may thermally diffuse into the bars, thus increasing the levels of impurities in the high-purity silicon bars.

Another embodiment of a silicon welding apparatus schematically illustrated in FIG. 4 includes a silicon heater plate 60, which supports the silicon bars 20, 22 arranged to have the seam 24 between them extending along a longitudinal axis of the heating plate 60. The silicon heater plate 60 may be a generally uniform block of silicon, which should have a relatively high purity level, such as is available with virgin polysilicon. Depending upon the application, it may be desirable to include a small amount of semiconductor doping in the heating plate 60 to facilitate its resistive heating. In other applications, such as welding very high-purity virgin silicon for contacting wafers, even dopants are not desired. Other impurities such as heavy or alkali metals should be minimized in the silicon heating plate 60.

The heating plate 60 may be supported on two molybdenum rods 62, 64 to provide thermal isolation over the welding table. Electrical isolation may also be required. A cathode contact 66 and an anode contact 68 are affixed to opposite ends of the silicon heating plate 60 along the plate's longitudinal axis. The heater power supply 34 is connected across the heating plate 60 through the cathode and anode contacts 66, 68. No fixed electrical contacts need to be made to the silicon bars 20, 22. The TIG welding apparatus include the TIG head 40 and welding power supply 38 and possibly the high-purity, semiconductor-grade silicon filler rod 52. These elements are positioned similarly as in FIG. 1, but the negative terminal of the welding power supply 38 is connected to the anode contact 68 of the heater plate 60.

To begin the silicon welding, the heater power supply 34 is turned on to heat the silicon heater plate 60 and the supported bars 20, 22 to at least 600° C. and preferably 700 to 900° C. Once the workpiece temperature has equilibrated, the welding power supply 38 is turned on to commence welding along the seam 24. The welding current depends on the size of the workpieces; however, a welding current of 30A has been observed to be generally sufficient. As in the embodiment of FIG. 1, the welding head 40 raises the local temperature to above 1416° C. to weld the two bars 20, 22 together across the seam 24.

The welding apparatus of FIG. 4 has several advantages. The electrical contacts need to be made only once to the heater plate, and the silicon bars can be quickly placed on and removed from the heater plate. Furthermore, the absence of electrical contact to the bars significantly eliminates contact metallization as a source of contamination. A further advantage of the configuration of FIG. 4 is that the welding current is grounded through the heater plate 60 and enters the heater plate 60 through an interface area having a dimension commensurate with the thickness of the bars 20, 22. As a result, the area around the weld has a more uniform temperature distribution. In contrast, when the welding current is grounded along the longitudinal axes of the bars, as in FIG. 1, the weld defines a boundary in the bars of a sudden change in longitudinally conveyed welding current. However, the temperatures at the interface between the bars 20, 22 and the heater plate 60 are far below the temperatures required for welding so that the bars 20, 22 can be easily removed from the heater plate 60 once they have cooled.

The welding apparatus of FIG. 4 has been successfully used to weld together two virgin polysilicon bars having widths and thicknesses of about 1 cm and lengths of about 10 cm. The resulting weld bead is smooth and continuous. When the bead is polished down to the level of the bars, a continuous, uniform, and crack-free material is observed.

The apparatus of FIG. 4 is relatively simple, but allows welding of planar stock pieces. One use is forming the silicon bases of the tower of FIG. 1 for use with 300 mm (12 inch) wafers. Such bases need to have diameters in the range of at least 325 mm. Czochralski-grown monocrystalline silicon has been grown in such sizes, but its availability is sporadic and it is very expensive. Virgin polysilicon is the preferred form of silicon for such towers, but the diameter of ingots commercially available at present is limited to about 150 mm.

Boyle et al. have disclosed in the above cited reference how virgin polysilicon can be cut and machined. These methods are used to cut the 150 mm-diameter virgin polysilicon rods into plates having the required length and thickness but of width substantially less than 325 mm. The welding apparatus of FIG. 4 may then be used to weld together two or more of these plates to form a base with the required diameter of 325 mm.

Figure 1:
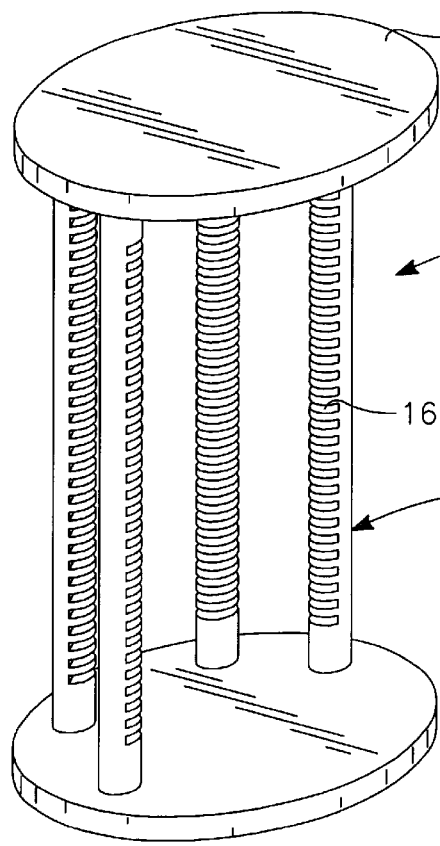
FIG. 1 is an isometric view of a silicon wafer tower which may be fabricated using the invention.

The welding of the parts of the silicon tower 10 of FIG. 1 is facilitated by the use of a somewhat more complex welding apparatus. Typically, the mortise holes formed in the bases 12 are precision machined to provide only 1 mil (25 $\mu$m) of clearance for the legs 14 being fit into the holes. As a result, heating of one of the bases 12 will effectively heat the end of the leg 14 fit in the base 12.

In one approach, similar to the welding apparatus of FIG. 2, heating current is supplied directly to each base. For example, four contacts may be made to the sides of the base 12 in respective areas adjacent to the hole in which the legs 14 are fit. For the welding of a particular leg 14, current is supplied to the adjacent contact, and one or more of the other contacts sink the current. The area around the welded joint is fairly uniformly heated.

Another approach is particularly applicable when, as illustrated in the cross-sectional view of FIG. 5, the tower leg 14 includes a smaller tenon 70 on its end, and the base 12 includes a stepped mortise hole 72 that penetrates through the base 12 and tightly receives the leg 14 and its tenon 70 with a small axially extending gap 74 therebetween, for example, a 25 $\mu$m gap. A silicon heater collar 80, additionally illustrated in the cross-sectional view of FIG. 6 taken along line 6—6 of FIG. 5 has a rectangular cross section and extends along a U-shaped axis that allows it to be fit around the leg 14 while it remains in contact the bottom surface of the base 14. The collar 80 may be clamped to the underside of the base 12 or the base 12 may rest on and supported by the collar 80. In either case, the collar 80 physically contacts the base 12. The silicon heater collar 80 is preferably formed of high-purity, semiconductor-grade silicon, just as for the silicon heater plate 60 of FIG. 4.

Electrodes 82, 84 are connected to the heater power supply to allow heating of the collar 80 to an elevated of 600 to 900° C. Since the collar 80 is in intimate contact with the base 12, the region of the base 12 around the collar 80 is similarly heated. Further, since only the narrow gap 74 exists between the base 12 and the leg 14, particularly its tenon 70, the leg tenon 70 is heated to nearly the same temperature.

After these bodies have been heated, an electric or plasma welding tip is applied to the area of the gap 74 at the top surface of the base 12 to form a weld 86. The weld 86 forms as a protruding bead and a portion extending at least 25 $\mu$m below the surface. It is particularly advantageous if, as illustrated, the tenon 70 is sufficiently long that it protrudes slightly beyond the top surface of the base 12. The protruding portion can provide a source of silicon to form the weld so that no silicon filler rod is required for the welding. After completion of the welding, the area of the base around the weld is polished to remove the bead and the protruding end of the tenon and to form a smooth surface with the base 12. Although in the typical worst case only a 25 µm-deep weld may remain, this depth is sufficient to provide the required rigidity and strength to the structure because the close fit of the leg 14 into the bottom portion of mortise hole 72 prevents significant flexing of the leg 14 relative to the base 12. However, if desired, the bottom corner 88 of the base mortise hole 72 may be similarly welded to the leg 14 by moving the silicon heater collar 80 to the top of the base 12 or employing other means to heat the top of the base 12.

The welding process of the invention can be applied to joining silicon members to form other structures than wafer towers and boats. Such boats and towers may be supported on silicon pedestals, be surrounded by silicon liners, or be enclosed in silicon tubes. Processing gas may be injected into such thermal processing units from silicon injectors or nozzles, and the gas may be supplied from the bottom of a tall furnace through silicon tubes. Silicon paddles or sleds may be used to transfer wafers to and from such towers or to and from single-wafer pedestals. Another class of structures include showerheads and gas diffusers related to one disclosed by Degner et al. in U.S. Pat. No. 5,074,456, which may be formed by welding a thin perforated silicon disk to a silicon ring support frame. Plasma processing chambers may be formed with silicon roofs or silicon walls. The susceptors or wafer chucks supporting wafers in thermal or plasma chambers may be formed of silicon parts. Silicon targets used for physical vapor deposition of silicon may be welded to silicon backing plates. Sharp silicon tips may be disposed in clean rooms to drain electrostatic charge.

It is thus seen that fairly standard welding equipment can be used to form a strong, high-purity, high-temperature, crack-free seam between silicon members being permanently joined together.

What is claimed is:

1. Two silicon members at least one of which comprises virgin polysilicon and which are fused together without the formation of cracks at a seam between the two members.

2. The two silicon members of claim 1, each of which comprises virgin polysilicon.

3. A welded member comprising two silicon workpieces at least one of which comprises virgin polysilicon and which are welded together without the formation of cracks at a seam between the two members.

4. The welded member of claim 3, wherein each of said two silicon workpieces comprises virgin polysilicon.

5. The welded product formed by the process of welding together two silicon workpieces, said process comprising the steps of:
   bringing together and juxtaposing two silicon workpieces along a seam to be welded;
   heating from a first heat source at least large areas of said workpieces to a heating temperature of at least 600°; and
   from a second heat source different from said first heat source, additionally applying heat to a localized area of at least one of said workpieces adjacent to said seam and included within said large areas to a welding temperature above 1416° C. to weld said workpieces together.

6. The product of claim 5, wherein no cracks are formed at a seam between said two workpieces welded together.

7. The product of claim 5, wherein at least one said silicon workpieces comprises virgin polysilicon.

8. The product of claim 5, wherein said heating temperature is no more than 900° C.

9. The product of claim 5, wherein heating step heats localized areas of both of said workpieces adjacent said seam.

10. The product of claim 5, wherein said applying step includes passing a current from a welding tip to said localized area.

11. The product of claim 5, wherein said applying step includes irradiating said localized area with a laser beam.

12. The product of claim 5, wherein said applying step includes applying a plasma arc to said localized area.

13. The welded product formed by the process of welding together two silicon workpieces, said process comprising the steps of:
   bringing together and juxtaposing said two silicon workpieces along a seam to be welded;
   contacting at least one of said workpieces to a heating element;
   passing a heating current across electrical terminals affixed to said heating element to thereby heat said two juxtaposed workpieces to a temperature of at least 600° C.; and
   additionally applying heat to a portion of said workpieces adjacent to a localized portion of said seam to weld said workpieces together.

14. The product of claim 13, wherein no cracks are formed at a seam between said two workpieces welded together.

15. The product of claim 13, wherein at least one of said silicon workpieces comprises virgin polysilicon.

16. The product of claim 13, wherein said temperature is no more than 900° C.

17. The product of claim 13, wherein said applying step includes passing electrical current from a welding tip through at least one of said workpieces.

18. The product of claim 13, wherein said applying step includes plasma welding.

19. The product of claim 13, wherein said heating element supports both of said two silicon workpieces.

20. The product of claim 13, wherein said heating element comprises a silicon body.

21. The product of claim 20, wherein said silicon body has portions having a level of impurities other than oxygen, nitrogen, and carbon of less than 1 ppm.

22. The product of claim 20, wherein said silicon body has a flat surface capable of supporting both of said workpieces.

23. The product of claim 13, wherein said heating element can be wrapped around one of said workpieces while contacting the other of said workpieces.

24. The product of the welding process which comprises the steps of:
   juxtaposing two silicon workpieces to be welded together along a seam;
   thermally contacting at least one of said juxtaposed silicon members to a heater plate;
   passing a heating current through said plate to heat said plate to a temperature of at least 600° C. and less than 1416° C.; and
   welding said two workpieces together by moving a welding tip along said seam and heating localized areas of said two workpieces.

25. The product of claim 24, wherein no cracks are formed at a seam between said two workpieces welded together.

26. The product of claim 24, wherein at least one of said two workpieces comprises virgin polysilicon.

27. The product of claim 24, wherein said temperature is no more than 900° C.

28. The product of claim 24, wherein said welding step includes passing a welding current from said welding tip to at least one of said two workpieces.

29. The product of claim 24, wherein said welding step heats said localized areas to above 1416° C.

30. The product of claim 24, wherein a first one of said workpieces has a hole therethrough and a second one of said workpieces has an attachment member fittable through said hole with a terminal portion extending past on an exposed side of said first workpiece and wherein said welding step moves said welding tip along said exposed side of said first workpiece.

31. The product of claim 30, further comprising the subsequent step of polishing said terminal portion of said second workpiece to be smooth with said exposed side of said first workpiece.

32. The product of claim 24, wherein said heater plate comprises a silicon body.

33. A process of welding together two silicon workpieces, comprising the steps of:

bringing together and juxtaposing two silicon workpieces along a seam to be welded;

heating from a first heat source at least large areas of said workpieces to a heating temperature of at least 600°; and from a second heat source different from said first heat source, additionally applying heat to a localized area of at least one of said workpieces adjacent to said seam and included within said large areas to a welding temperature above 1416° C. to weld said workpieces together.

34. The process of claim 33, wherein at least one said silicon workpieces comprises virgin polysilicon.

35. The process of claim 33, wherein said heating temperature is no more than 900° C.

36. The process of claim 33, wherein said applying step includes irradiating said localized area with a laser beam.

37. The process of claim 33, wherein said applying step includes applying a plasma arc to said localized area.

* * * * *